United States Patent
Yamada et al.

(10) Patent No.: US 9,883,065 B2
(45) Date of Patent: Jan. 30, 2018

(54) IMAGE READING DEVICE, IMAGE FORMING APPARATUS, AND IMAGE READING METHOD

(71) Applicant: FUJI XEROX CO., LTD., Tokyo (JP)

(72) Inventors: Kenji Yamada, Kanagawa (JP); Kosuke Shimizu, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/042,376

(22) Filed: Feb. 12, 2016

(65) Prior Publication Data
US 2017/0078506 A1 Mar. 16, 2017

(30) Foreign Application Priority Data
Sep. 16, 2015 (JP) ................................. 2015-183097

(51) Int. Cl.
*H04N 1/04* (2006.01)
*H04N 1/00* (2006.01)

(52) U.S. Cl.
CPC ..... *H04N 1/00779* (2013.01); *H04N 1/00572* (2013.01); *H04N 1/00718* (2013.01); *H04N 1/00748* (2013.01); *H04N 1/0405* (2013.01); *H04N 2201/043* (2013.01); *H04N 2201/0416* (2013.01)

(58) Field of Classification Search
CPC ........... H04N 1/00779; H04N 1/00572; H04N 1/00718
See application file for complete search history.

(56) References Cited

U.S. PATENT DOCUMENTS

| 6,888,650 | B1* | 5/2005 | Mizubata | H04N 1/00681 358/1.2 |
|---|---|---|---|---|
| 8,665,502 | B2 | 3/2014 | Masaki et al. | |
| 9,001,391 | B2* | 4/2015 | Masaki | G03G 15/607 358/1.15 |
| 2006/0039627 | A1* | 2/2006 | Li | H04N 1/3878 382/289 |
| 2006/0039629 | A1* | 2/2006 | Li | H04N 1/00681 382/289 |
| 2009/0185240 | A1* | 7/2009 | Kato | H04N 1/00681 358/474 |

(Continued)

FOREIGN PATENT DOCUMENTS

JP 2013-146034 A 7/2013
JP 2015-18328 A 1/2015

*Primary Examiner* — Cheukfan Lee
(74) *Attorney, Agent, or Firm* — Sughrue Mion, PLLC

(57) ABSTRACT

An image reading device includes a reading member and a skew detector. The reading member reads an image of a passing document at a read position preset in a document transport path. The skew detector detects a skew of the document by selecting one of a first skew detection mode and a second skew detection mode based on information that specifies a method for detecting the skew of the document. The first skew detection mode is a mode in which the skew of the document relative to a transport direction is detected based on an image of a leading-edge section, in the transport direction, read by the reading member. The second skew detection mode is a mode in which the skew of the document relative to the transport direction is detected based on an entire image read by the reading member.

6 Claims, 10 Drawing Sheets

(56) References Cited

U.S. PATENT DOCUMENTS

2013/0083373 A1* 4/2013 Saito .................. H04N 1/00748
                                                      358/488
2015/0207941 A1* 7/2015 Koda ................... H04N 1/0079
                                                      358/3.26
2015/0319335 A1* 11/2015 Baba ..................... H04N 1/047
                                                      358/447

* cited by examiner

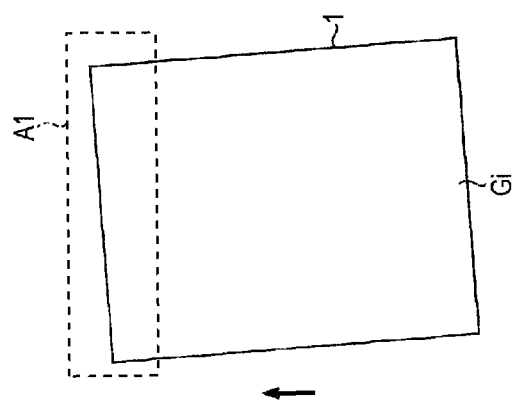
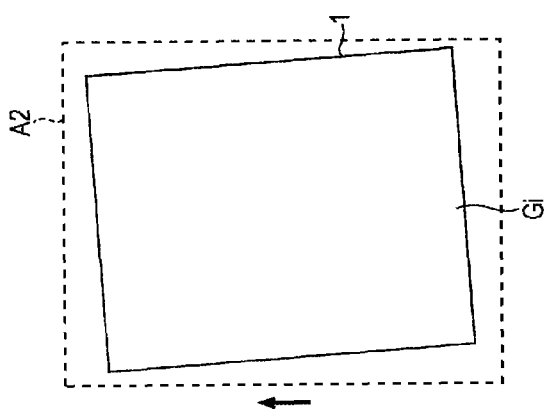
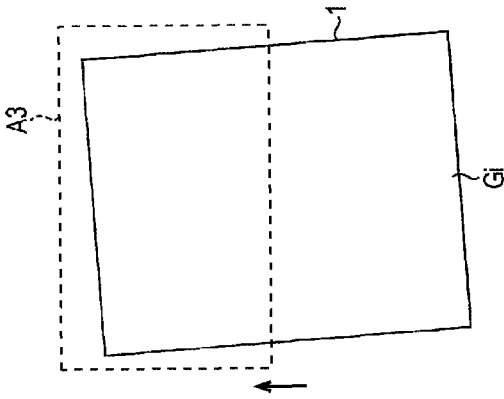

$$\tan \theta = \frac{L2}{L1} = \frac{L0}{400}$$

IMAGE READING DEVICE, IMAGE FORMING APPARATUS, AND IMAGE READING METHOD

CROSS-REFERENCE TO RELATED APPLICATIONS

This application is based on and claims priority under 35 USC 119 from Japanese Patent Application No. 2015-183097 filed Sep. 16, 2015.

BACKGROUND

Technical Field

The present invention relates to image reading devices, image forming apparatuses, and image reading methods.

SUMMARY

According to an aspect of the invention, there is provided an image reading device including a reading member and a skew detector. The reading member reads an image of a passing document at a read position preset in a document transport path. The skew detector detects a skew of the document by selecting one of a first skew detection mode and a second skew detection mode based on information that specifies a method for detecting the skew of the document. The first skew detection mode is a mode in which the skew of the document relative to a transport direction is detected based on an image of a leading-edge section, in the transport direction, read by the reading member. The second skew detection mode is a mode in which the skew of the document relative to the transport direction is detected based on an entire image read by the reading member.

BRIEF DESCRIPTION OF THE DRAWINGS

An exemplary embodiment of the present invention will be described in detail based on the following figures, wherein:

FIGS. 6A to 6C illustrate skew-detection images according to the first exemplary embodiment, FIG. 6A illustrating a detection image in a case where a reading-rate-prioritized mode is set, FIG. 6B illustrating a detection image in a case where a reading-accuracy-prioritized mode is set, and FIG. 6C illustrating a detection image in a case where a user-setting mode is set;

DETAILED DESCRIPTION

Figure 1:
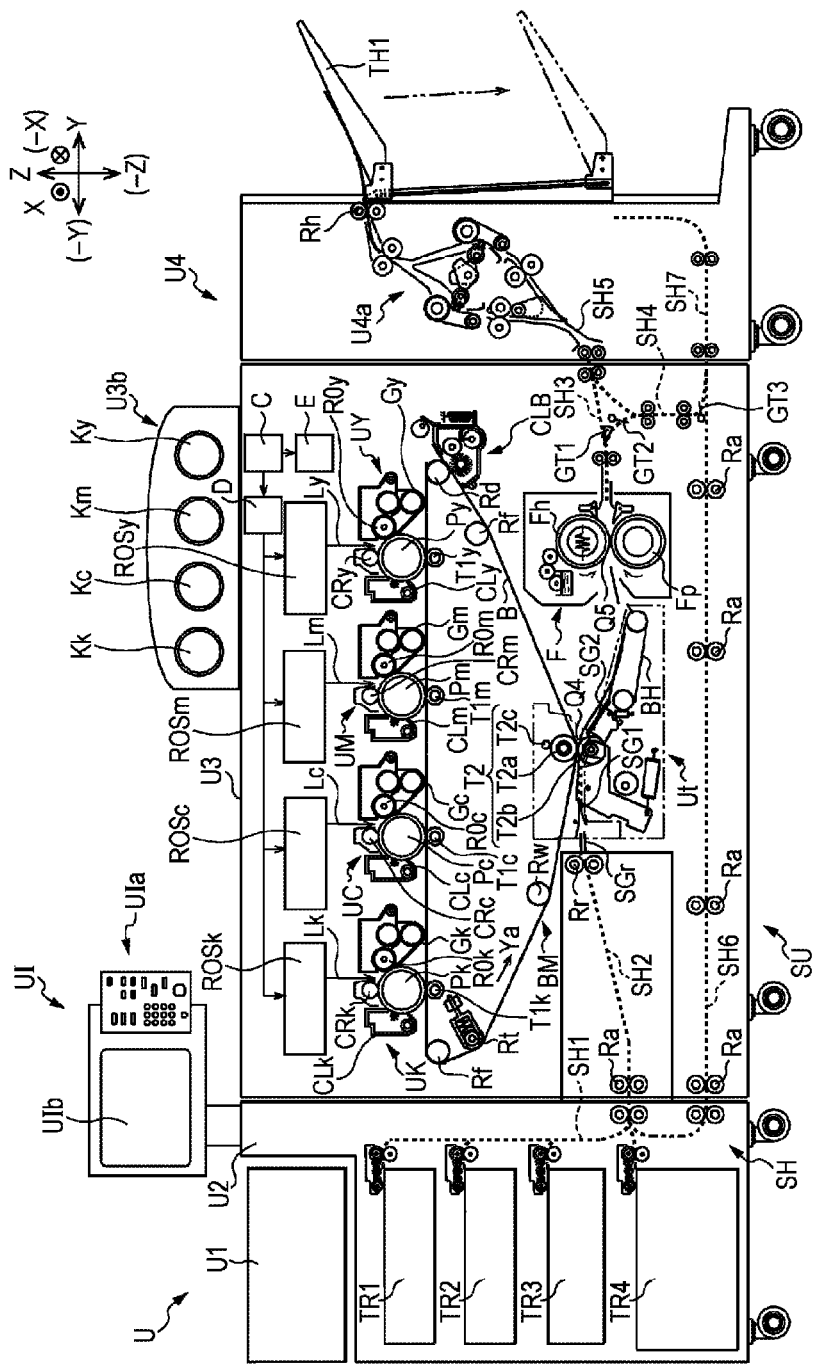
FIG. 1 is an overall view of an image forming apparatus according to a first exemplary embodiment.

Although a specific exemplary embodiment of the present invention will be described below with reference to the drawings, the present invention is not to be limited to the following exemplary embodiment.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

FIG. 1 is an overall view of an image forming apparatus according to a first exemplary embodiment.

Figure 2:
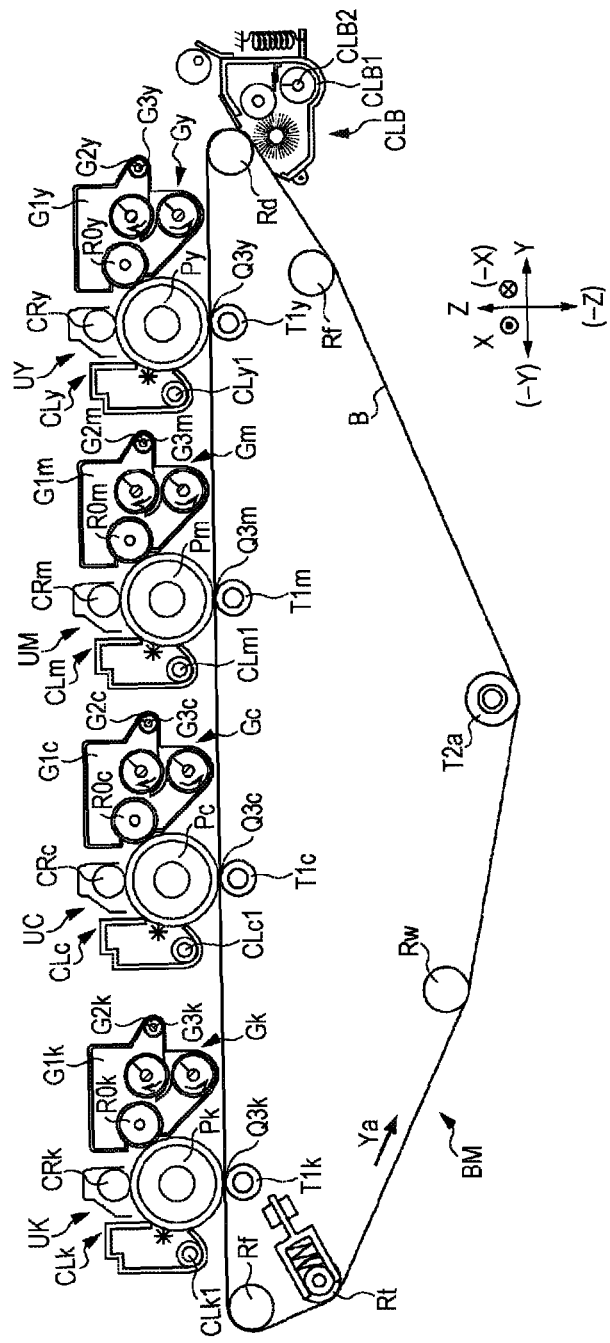
FIG. 2 is an enlarged view of a visible-image forming apparatus according to the first exemplary embodiment.

FIG. 2 is an enlarged view of a visible-image forming apparatus according to the first exemplary embodiment.

In FIG. 1, a copier U as an example of the image forming apparatus has an operable section UI, a scanner section U1 as an example of an image reading device, a feeder section U2 as an example of a medium feeding device, an image forming section U3 as an example of an image recording device, and a medium processing device U4.

Operable Section UI

The operable section UI has input buttons UIa used for starting copying and for setting the number of copy sheets. Moreover, the operable section UI has a display UIb that displays the contents input via the input buttons UIa as well as the status of the copier U.

Scanner Section U1

Figure 3:
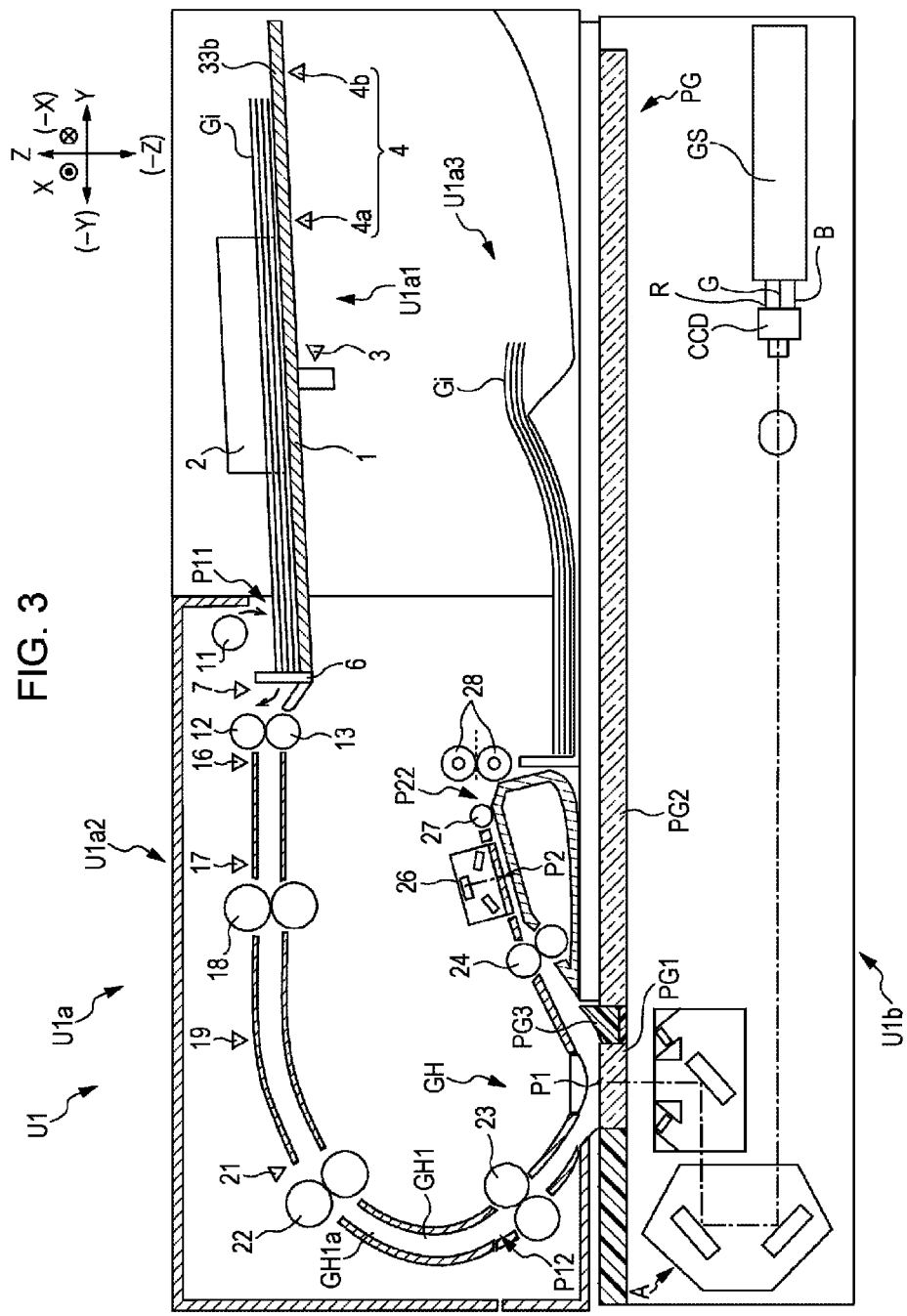
FIG. 3 is an overall view of an image reading device according to the first exemplary embodiment.

FIG. 3 is an overall view of the image reading device according to the first exemplary embodiment.

In FIGS. 1 and 3, the scanner section U1 has a scanner body U1b as an example of an image-reading-device body, which has a transparent document base PG at an upper end thereof. A document transport device U1a is disposed at the upper surface of the scanner body U1b. The document transport device U1a is supported in an openable-closable manner such that it is capable of uncovering and covering the document base PG.

The document transport device U1a has a document feed tray U1a1 as an example of a document load section that accommodates a stack of multiple documents Gi to be copied. A document transport section U1a2 is provided to the left of the document feed tray U1a1. The document transport section U1a2 transports the documents Gi on the document feed tray U1a1 onto the document base PG. A document output tray U1a3 as an example of a document output section is disposed below the document feed tray U1a1. Each document Gi that has traveled over the document base PG is output onto the document output tray U1a3 from the document transport section U1a2.

In FIG. 3, a read window PG1 as an example of a first read surface over which a document travels is disposed at the left end of the document base PG. The read window PG1 is formed in correspondence with a predetermined first-face read position P1 in a transport path of the document transport device U1a. Each document Gi transported by the document transport device U1a travels over the read window PG1. Platen glass PG2 that supports a document Gi set by a user is disposed to the right of the read window PG1. A document guide PG3 as an example of a guide is supported between the read window PG1 and the platen glass PG2. The document guide PG3 guides each document Gi that has traveled over the read window PG1 into the document transport device U1a.

An exposure optical system A is supported inside the scanner body U1b. Reflected light from the document Gi is converted into red (R), green (G), and blue (B) electric signals by a solid-state imaging element CCD as an example of a first reading member via multiple optical members of the exposure optical system A and is input to an image processor GS.

The image processor GS converts the R, G, and B electric signals input from the solid-state imaging element CCD into black (K), yellow (Y), magenta (M), and cyan (C) image information, temporarily stores the image information, and outputs the image information as latent-image-forming image information to a latent-image-forming-device drive circuit D of the image forming section U3 at a predetermined timing.

If a document image is a monochrome image, black (K) image information alone is input to the latent-image-forming-device drive circuit D.

The document base PG, the exposure optical system A, the solid-state imaging element CCD, and the image processor GS constitute the scanner body U1b according to the first exemplary embodiment.

Feeder Section U2

In FIG. 1, the feeder section U2 has feed trays TR1, TR2, TR3, and TR4 as an example of medium containers. Furthermore, the feeder section U2 has, for example, a medium feed path SH1 that fetches a recording sheet S as an example of a medium accommodated in each of the feed trays TR1 to TR4 and transports the recording sheet S to the image forming section U3.

Image Forming Section U3 and Medium Processing Device U4

Referring to FIGS. 1 and 2, in the image forming section U3, the latent-image-forming-device drive circuit D outputs a drive signal to latent-image forming devices ROSy to ROSk of the respective colors based on, for example, the image information input from the scanner section U1. For example, photoconductor drums Py to Pk as an example of image bearing members and charging rollers CRy to CRk are disposed below the latent-image forming devices ROSy to ROSk. Electrostatic latent images are formed on the surfaces of the photoconductor drums Py to Pk by the latent-image forming devices ROSy to ROSk and are developed into toner images as an example of visible images by developing devices Gy to Gk. The developing devices Gy to Gk are supplied with developers from toner cartridges Ky to Kk attached to a developer supplying device U3b. The toner images on the surfaces of the photoconductor drums Py to Pk are transferred onto an intermediate transfer belt B as an example of an intermediate transfer body in first-transfer regions Q3y to Q3k by first-transfer rollers T1y to T1k. After the first-transfer process, the photoconductor drums Py to Pk are cleaned by cleaners CLy to CLk.

An intermediate transfer device BM is supported below the latent-image forming devices ROSy to ROSk. The intermediate transfer device BM has the intermediate transfer belt B as an example of an intermediate transfer member and support members Rd+Rt+Rw+Rf+T2a for the intermediate transfer member. The intermediate transfer belt B is supported in a rotatable manner in a direction indicated by an arrow Ya. A second-transfer unit Ut is disposed below an opposing member T2a. The second-transfer unit Ut has a second-transfer member T2b. The second-transfer member T2b comes into contact with the intermediate transfer belt B so as to form a second-transfer region Q4. The opposing member T2a is in contact with an electric feed member T2c. The electric feed member T2c is supplied with second-transfer voltage with the same polarity as the charge polarity of toners.

A transport path SH2 along which the recording sheet S from the feeder section U2 is transported is disposed below the intermediate transfer device BM. In the transport path SH2, the recording sheet S is transported by a transport roller Ra as an example of a transport member to a registration roller Rr as an example of a transport-timing adjusting member. The registration roller Rr transports the recording sheet S to the second-transfer region Q4 in accordance with the timing at which the toner images on the intermediate transfer belt B are transported to the second-transfer region Q4.

When the toner images on the intermediate transfer belt B pass through the second-transfer region Q4, the toner images are transferred onto the recording sheet S by a second-transfer unit T2. After the second-transfer process, the intermediate transfer belt B is cleaned by an intermediate-transfer-body cleaner CLB. The recording sheet S having the toner images transferred thereon is transported to a medium transport belt BH as an example of a transport member and is then transported to a fixing device F. In the fixing device F, the recording sheet S having the toner images transferred thereon travels through a fixing region Q5 where a heating member Fh and a pressing member Fp come into contact with each other, so that the toner images become fixed onto the recording sheet S.

If the recording sheet S having the toner images fixed thereon is to be output, the recording sheet S is transported from a transport path SH3 to a transport path SH5 in the medium processing device U4. The medium processing device U4 has a curl correcting member U4a that corrects a curl in the recording sheet S, and also has an output member Rh by which the recording sheet S is output onto an output tray TH1. If an image is to be recorded onto the second face of the recording sheet S, the recording sheet S having the toner images fixed thereon is transported from the transport path SH3 to an inversion path SH4 and a circulation path SH6 so as to be turned over, and then travels along the medium feed path SH1 so as to be transported again to the second-transfer region Q4. The switching between the transport destinations is performed by switching members GT1 to GT3. A sheet transport path SH is constituted by components denoted by the reference characters SH1 to SH7. Furthermore, a sheet transport device SU according to the first exemplary embodiment is constituted by components denoted by the reference characters SH, Ra, Rr, Rh, SGr, SG1, SG2, BH, and GT1 to GT3.

Document Transport Device

Figure 4:
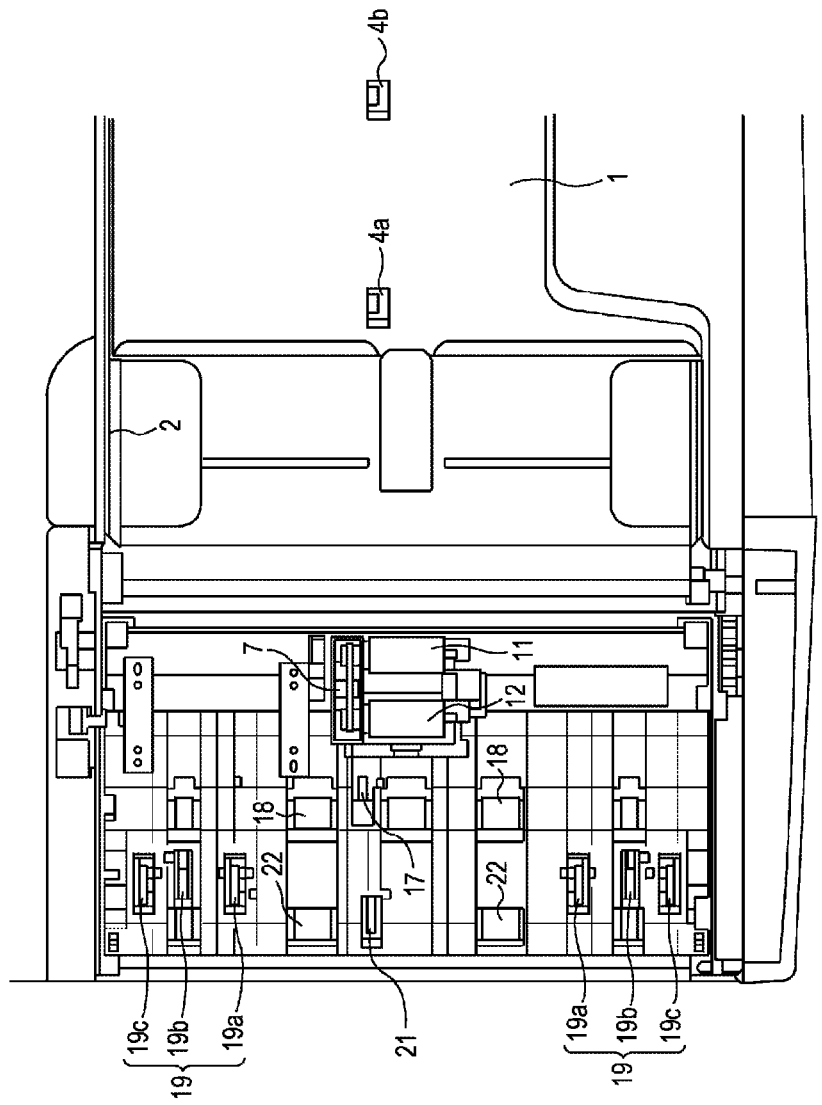
FIG. 4 illustrates the positional relationship of transport members and detecting members in a document transport device according to the first exemplary embodiment.

FIG. 4 illustrates the positional relationship of the transport members and detecting members in the document transport device U1a according to the first exemplary embodiment.

In FIGS. 3 and 4, the document feed tray U1a1 as an example of a document container has a feed tray body 1 as an example of a load member. The feed tray body 1 has a shape of a plate extending diagonally toward the upper right side.

A side guide 2 as an example of a medium alignment member is supported by a rear portion of the feed tray body 1. The side guide 2 is supported in a movable manner in the front-rear direction, that is, the width direction of the documents Gi. The side guide 2 aligns the documents Gi by coming into contact with a widthwise edge of the documents Gi. Furthermore, the feed tray body 1 supports a tray-width sensor 3 as an example of a fourth detecting member. The tray-width sensor 3 detects the widthwise position of the side guide 2, that is, the width of the documents Gi.

The feed tray body 1 also supports a tray-size sensor 4 as an example of a detecting member. The tray-size sensor 4 according to the first exemplary embodiment includes a first tray-size sensor 4a disposed at the center in the left-right direction and a second tray-size sensor 4b disposed at the right side. The tray-size sensor 4 according to the first exemplary embodiment detects the presence or absence of a document Gi. Thus, when a document Gi is detected by both tray-size sensors 4a and 4b, it is determinable that the document Gi is a maximum-size document that is long in the transport direction thereof. If a document Gi is detected only by the first tray-size sensor 4a, it is determinable that the document Gi is a medium-size document. If a document Gi is not detected by either of the two tray-size sensors 4a and 4b, it is determinable that the document Gi is a small-size document.

A set gate 6 as an example of a medium alignment member is disposed at the left end of the document feed tray U1a1. The set gate 6 is supported in a rotatable manner. Before the documents Gi are transported, the set gate 6 is maintained in a hanging state such that the documents Gi are alignable by bringing the leading edge of the documents Gi in the transport direction into abutment with the set gate 6. When the transporting of the documents Gi commences, the set gate 6 is released and becomes rotatable toward the downstream side, so as not to interfere with the transporting of the documents Gi.

Furthermore, a set sensor 7 as an example of a detecting member is disposed at a position displaced from the set gate 6 in the front-rear direction. The set sensor 7 detects the presence or absence of a document or documents Gi abutting on the set gate 6.

A nudging roller 11 as an example of a document fetching member is disposed above the set gate 6 and upstream thereof in the document transport direction. The nudging roller 11 according to the first exemplary embodiment is configured to be ascendable and descendible.

A feed roller 12 as an example of a document transport member is disposed downstream of the set gate 6. A retardation roller 13 as an example of a document separating member is disposed below the feed roller 12 so as to face the feed roller 12.

A feed-in sensor 16 as an example of a detecting member is disposed downstream of the feed roller 12 and the retardation roller 13. The feed-in sensor 16 detects the presence or absence of a document Gi.

A feed-out sensor 17 as an example of a first detecting member is disposed downstream of the feed-in sensor 16. The feed-out sensor 17 detects the presence or absence of a document Gi.

A take-away roller 18 as an example of a document transport member and also as an example of a skew correcting member is disposed downstream of the feed-out sensor 17.

A document-width sensor 19 as an example of a second detecting member is disposed downstream of the take-away roller 18. In FIG. 4, the document-width sensor 19 according to the first exemplary embodiment includes multiple document-width sensors 19 spaced apart in the width direction of the document Gi. Specifically, the document-width sensors 19 include a pair of front and rear first document-width sensors 19a disposed at positions corresponding to a B5-size document Gi, a pair of front and rear second document-width sensors 19b disposed at positions corresponding to an A4-size document Gi, and a pair of front and rear third document-width sensors 19c disposed at positions corresponding to a B4-size document Gi.

A preregistration sensor 21 as an example of a third detecting member is disposed downstream of the document-width sensors 19. The preregistration sensor 21 detects the presence or absence of a document Gi.

A preregistration roller 22 as an example of a document transport member is disposed downstream of the preregistration sensor 21.

A document registration roller 23 as an example of a document transport member is disposed downstream of the preregistration roller 22. The document registration roller 23 adjusts the timing for transporting a document Gi toward the first-face read position P1.

An out roller 24 as an example of a document transport member is disposed downstream of the document registration roller 23 at a position downstream of the first-face read position P1.

A second-face read position P2 is set downstream of the out roller 24. A read sensor 26 as an example of a second reading member is disposed at the second-face read position P2. The read sensor 26 according to the first exemplary embodiment is a contact image sensor (CIS).

A reading roller 27 as an example of a reading assistance member is disposed downstream of the read sensor 26. An output roller 28 that outputs a document Gi onto the document output tray U1a3 is disposed downstream of the reading roller 27.

Functions of Scanner Body U1b and Document Transport Device U1a

When the scanner body U1b having the above-described configuration is to read an image from a document Gi placed on the platen glass PG2, the exposure optical system A scans the document Gi from the left edge to the right edge thereof. Reflected light from the document Gi is received by the solid-state imaging element CCD, so that the image of the document Gi is read.

When images of documents Gi transported by the document transport device U1a are to be read, the nudging roller 11 descends so as to come into contact with the uppermost surface of the documents Gi. Then, the nudging roller 11 rotates so as to feed the documents Gi. The documents Gi fed by the nudging roller 11 are separated one-by-one by the feed roller 12 and the retardation roller 13. Each separated document Gi is transported to the preregistration roller 22 by the take-away roller 18.

The document Gi transported by the preregistration roller 22 is transported to the first-face read position P1 by the document registration roller 23 in accordance with a predetermined timing. Reflected light from the document Gi passing the first-face read position P1 is received by the solid-state imaging element CCD, so that the image of the document Gi is read. The document Gi that has passed the first-face read position P1 is transported by the out roller 24 to the second-face read position P2. If both faces of the document Gi are to be read, the read sensor 26 reads an image of the second face, which is opposite the first face read by the solid-state imaging element CCD.

In the first exemplary embodiment, when an image is to be read by the read sensor 26, the reading roller 27 retains the document Gi so that the gap between the document Gi and the read sensor 26 may be readily made stable. The document Gi that has passed the second-face read position P2 is output to the document output tray U1a3 by the output roller 28.

Controller According to First Exemplary Embodiment

Figure 5:
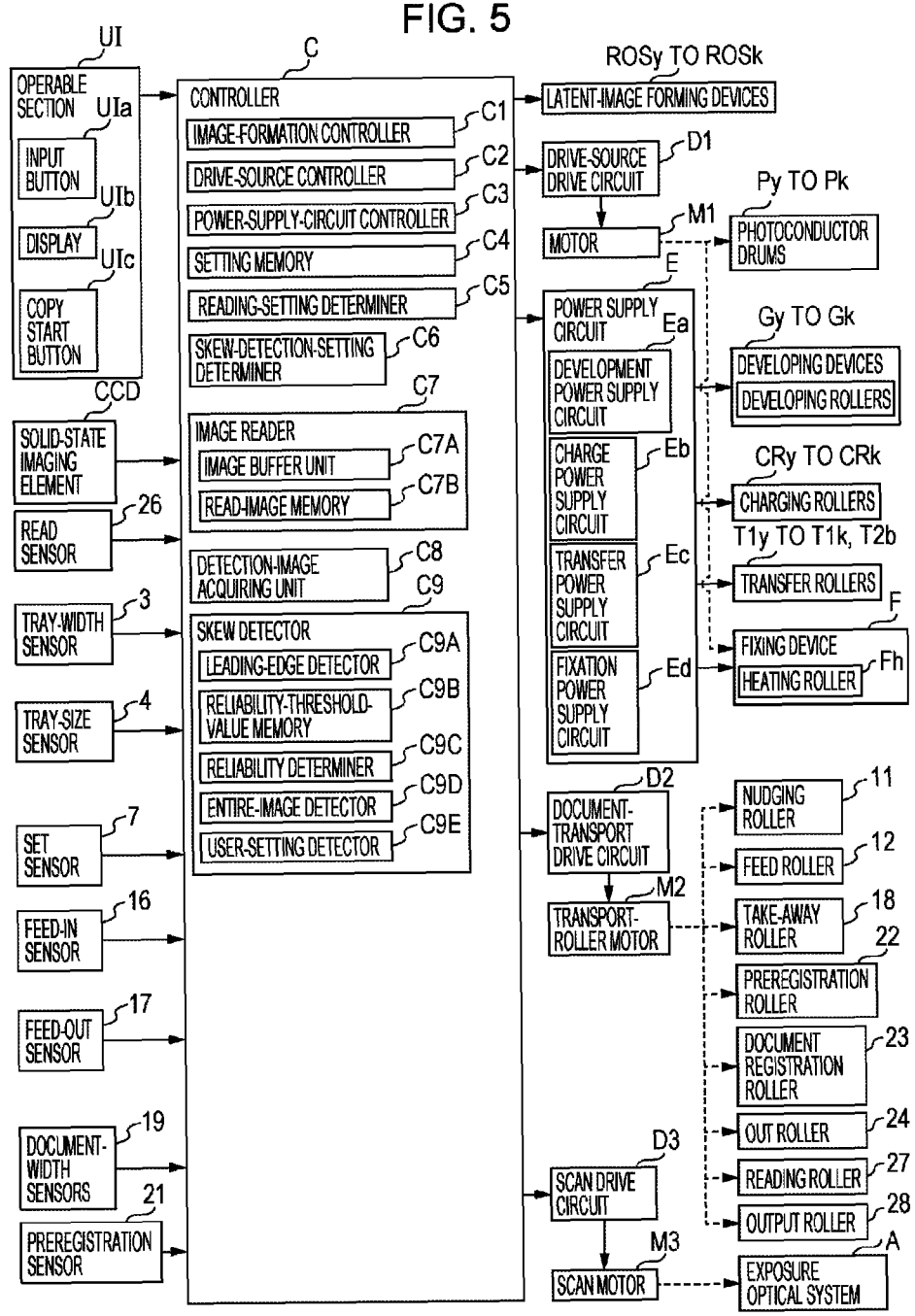
FIG. 5 is a block diagram illustrating functions included in a controller of the image forming apparatus according to the first exemplary embodiment.

FIG. 5 is a block diagram illustrating functions included in a controller of the image forming apparatus according to the first exemplary embodiment.

In FIG. 5, a controller C of the copier U has an input-output interface I/O used for receiving and outputting a signal from and to the outside. The controller C also has a read-only memory (ROM) that stores, for example, programs and information used for performing processes. Moreover, the controller C has a random access memory (RAM) that temporarily stores data. The controller C also has a central processing unit (CPU) that performs a process in accordance with a program stored in, for example, the ROM. Therefore, the controller C according to the first exemplary embodiment is constituted by a small-size information processing device, that is, a so-called microcomputer. Accordingly, the controller C is capable of realizing various functions by executing the programs stored in, for example, the ROM.

Signal Output Components Connected to Controller C

The controller C receives output signals from signal output components, such as the operable section UI, the solid-state imaging element CCD, the read sensor 26, and the sensors 3, 4, 7, 16, 17, 19, and 21.

The operable section UI includes the input buttons UIa, such as a button for inputting the number of print sheets and an arrow button, the display UIb as an example of a notifying member, and a copy start button UIc as an example of an input member for inputting start of a copying operation or a document reading operation.

The solid-state imaging element CCD reads a first-face image of a document Gi.

The read sensor 26 reads a second-face image of a document Gi passing the second-face read position P2.

The tray-width sensor 3 detects the width of a document Gi based on the widthwise position of the side guide 2.

The tray-size sensor 4 detects the length of a document Gi in the transport direction.

The set sensor 7 detects the presence or absence of a document Gi abutting on the set gate 6.

The feed-in sensor 16 detects the presence or absence of a document Gi in the vicinity of the feed roller 12.

The feed-out sensor 17 detects the presence or absence of a document Gi at the upstream side of the take-away roller 18.

The document-width sensors 19 detect the width of a document Gi.

The preregistration sensor 21 detects the presence or absence of a document Gi at the upstream side of the preregistration roller 22.

Controlled Components Connected to Controller C

The controller C is connected to a drive-source drive circuit D1, a document-transport drive circuit D2, a scan drive circuit D3, a power supply circuit E, and other controlled components (not shown). The controller C outputs control signals to, for example, the circuits D1 to D3 and E.

The drive-source drive circuit D1 rotationally drives, for example, the photoconductor drums Py to Pk as an example of image bearing members and the intermediate transfer belt B via a motor M1 as an example of a drive source.

The document-transport drive circuit D2 as an example of a document-transport-device drive circuit drives a transport-roller motor M2 as an example of a document-transport drive source so as to rotationally drive, for example, the nudging roller 11, the feed roller 12, and the take-away roller 18 disposed in the document transport path GH.

The scan drive circuit D3 drives a scan motor M3 as an example of a scan drive source so as to move the exposure optical system A in the left-right direction along the lower surface of the document base PG via, for example, a gear (not shown).

The power supply circuit E includes a development power supply circuit Ea, a charge power supply circuit Eb, a transfer power supply circuit Ec, and a fixation power supply circuit Ed.

The development power supply circuit Ea applies development voltage to developing rollers of the developing devices Gy to Gk.

The charge power supply circuit Eb applies charge voltage to the charging rollers CRy to CRk so as to electrostatically charge the surfaces of the photoconductor drums Py to Pk.

The transfer power supply circuit Ec applies transfer voltage to the second-transfer member T2b via the first-transfer rollers T1y to T1k and the electric feed member T2c.

The fixation power supply circuit Ed supplies electric power for heating the heating roller Fh of the fixing device F.

Functions of Controller C

The controller C has a function of executing processing according to input signals from the signal output components and outputting control signals to the controlled components. Specifically, the controller C has the following functions.

An image-formation controller C1 controls, for example, the driving of each component in the copier U and the voltage application timing in accordance with image information input from the solid-state imaging element CCD or the read sensor 26 of the scanner section U1 so as to execute a job, which is an image forming operation.

A drive-source controller C2 controls the driving of the motor M1 via the drive-source drive circuit D1 so as to control the driving of, for example, the photoconductor drums Py to Pk.

A power-supply-circuit controller C3 controls the power supply circuits Ea to Ed so as to control the voltage to be applied to each component and the electric power to be supplied to each component.

A setting memory C4 stores various kinds of setting information of the copier U, which include reading-process setting information and skew-detection setting information.

In the first exemplary embodiment, examples of the reading-process setting information include setting information indicating whether the document size is a typical size or an atypical size, setting information indicating whether the document size is the same (i.e., non-mixed-size mode) or includes a mixture of multiple sizes (i.e., mixed-size mode), setting information indicating whether the document to be read is to be expanded or reduced, and setting information indicating whether or not to allocate multiple document pages to a single recording sheet S. Furthermore, in the first exemplary embodiment, examples of the skew-detection setting information include setting information indicating whether to perform skew detection in a reading-rate-prioritized mode, setting information indicating whether to perform skew detection in a reading-accuracy-prioritized mode, and setting information indicating whether to perform skew detection based on the settings input by a user via the operable section UI. When the user inputs information via the operable section UI, each piece of setting information is updated in accordance with the input contents.

A reading-setting determiner C5 determines the settings with which an image reading process is to be executed based on the reading-process setting information stored in the setting memory C4.

A skew-detection-setting determiner C6 determines which method is set for detecting a skew of a document Gi based on the skew-detection setting information stored in the setting memory C4. In the skew-detection-setting determiner C6 according to the first exemplary embodiment, if the reading-setting determiner C5 determines that there is a mixture of document sizes, that is, a mixed-size mode, the reading-accuracy-prioritized detection method is set regardless of the skew-detection setting information.

An image reader C7 acquires images read by the reading members CCD and 26. The image reader C7 according to the first exemplary embodiment has an image buffer unit C7A as an example of a temporary memory and also has a read-image memory C7B.

The image buffer unit C7A temporarily stores an image read by the solid-state imaging element CCD. The image buffer unit C7A according to the first exemplary embodiment temporarily stores, for example, an image of a 15-mm range of a document Gi in the transport direction thereof. When an image of a region acquired at an older reading time point is output to the image forming section U3 or the read-image memory C7B, the image of the older region is deleted. Every time a new image is read by the solid-state imaging element CCD, the stored image is updated as needed such that the newly-read image is added. In the first exemplary embodiment, if the non-mixed-size mode, the expansion/reduction mode, or the multiple-page allocation mode are not set and the skew detection method is set in the reading-rate-prioritized mode, image data read by the solid-state imaging element CCD is output to the image forming section U3 via the image buffer unit C7A. At this time, since a skew angle of the document Gi is quickly calculated by a leading-edge detector C9A, which will be described later, from when the solid-state imaging element CCD starts reading, the image data stored in the image buffer unit C7A is read out slantwise to cancel out the skew angle, so that the image data is outputtable to the image forming section U3 while correcting the skew angle.

The read-image memory C7B stores read images read by the reading members CCD and 26. The read-image memory C7B according to the first exemplary embodiment acquires and stores image data temporarily stored in the image buffer unit C7A in the case where the mixed-size mode, the expansion/reduction mode, or the multiple-page allocation mode is set or in a case where the skew detection method is set in the reading-accuracy-prioritized mode (i.e., a memory-type registration-less mode to be described later) or in the user-setting mode. In the first exemplary embodiment, if the expansion/reduction mode is set for the reading settings, the expanded or reduced image is stored into the read-image memory C7B and is subsequently output to the image forming section U3. If the multiple-page allocation mode is set, the image after the allocation is stored into the read-image memory C7B and is subsequently output to the image forming section U3. Furthermore, in the first exemplary embodiment, if the mixed-size mode is set for the reading settings, a read image of the entire page is stored for each of the pages of documents Gi so as to determine the document size of each page of document Gi. The read images are then output to the image forming section U3. Moreover, in the first exemplary embodiment, if the skew detection method is set in the reading-rate-prioritized mode, an image of the entire page is stored for each of the pages of documents Gi. Furthermore, in the first exemplary embodiment, if the skew detection method is set in the user-setting mode, the read-image memory C7B acquires and stores, from the image buffer unit C7A, an image from a read start position according to the size of a set region. Moreover, in the first exemplary embodiment, even in a state where the reading-rate-prioritized mode is set and read image data is not stored in the read-image memory C7B, if it is determined that the reliability of a skew amount L0, which will be described later, is low, the read-image memory C7B acquires an image from the leading edge of a document Gi remaining in the image buffer unit C7A at the point when the low-reliability determination result is obtained, and then acquires an image read subsequently as needed, thereby acquiring the image of the entire page of the document Gi.

FIGS. 6A to 6C illustrate skew-detection images according to the first exemplary embodiment. Specifically, FIG. 6A illustrates a detection image in a case where the reading-rate-prioritized mode is set, FIG. 6B illustrates a detection image in a case where the reading-accuracy-prioritized mode is set, and FIG. 6C illustrates an example of a detection image in a case where the user-setting mode is set.

A detection-image acquiring unit C8 acquires a skew-detection image from a read image read by the solid-state imaging element CCD in accordance with the skew detection method determined by the skew-detection-setting determiner C6. As shown in FIG. 6A, in a case where the reading-rate-prioritized mode is set, the detection-image acquiring unit C8 according to the first exemplary embodiment acquires, from the image buffer unit C7A, an image of a preset region A1 of a leading-edge section of the document Gi in the transport direction thereof. As shown in FIG. 6B, in a case where the reading-accuracy-prioritized mode is set, the detection-image acquiring unit C8 according to the first exemplary embodiment acquires an image of an entire region A2 of the document Gi from the read-image memory C7B. Furthermore, in a case where the user designates and sets a region A3, as shown in FIG. 6C, via the operable section UI, the detection-image acquiring unit C8 according to the first exemplary embodiment acquires an image of the set region A3 from the read-image memory C7B. Although a 10-mm region from the read start position of the solid-state imaging element CCD is set as an example of the region A1 in the first exemplary embodiment, the region A1 is not limited to such a 10-mm region and may be set as a region with a length equivalent to five rows, that is, five lines, including the leading edge of the document Gi. Moreover, in a case where the mixed-size mode is set, the image of the region A2 is acquired by acquiring the entire read-image information of the document Gi stored in the read-image memory C7B.

A skew detector C9 has a leading-edge detector C9A as an example of a first skew detector, a reliability-threshold-value memory C9B, a reliability determiner C9C, an entire-image detector C9D as an example of a second skew detector, and a user-setting detector C9E as an example of a third skew detector. The skew detector C9 selects a skew detection method in accordance with a determination result obtained by the skew-detection-setting determiner C6 and detects a skew of a document Gi. In the first exemplary embodiment, the skew detector C9 performs skew detection of documents Gi on a sheet-by-sheet basis.

Figure 7A:
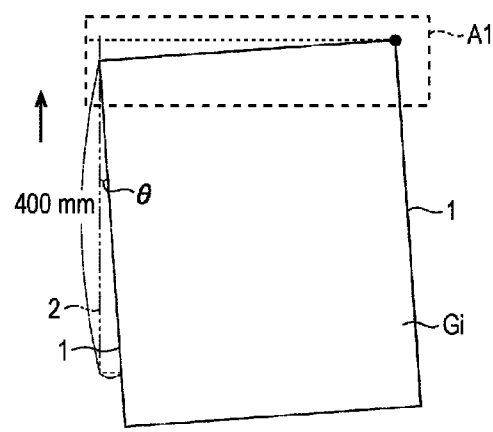
FIGS. 7A and 7B illustrate an example of a first skew detection mode according to the first exemplary embodiment, FIG. 7A illustrating a leading-edge region, FIG. 7B being an enlarged view of a relevant part in FIG. 7A.
Figure 7B:
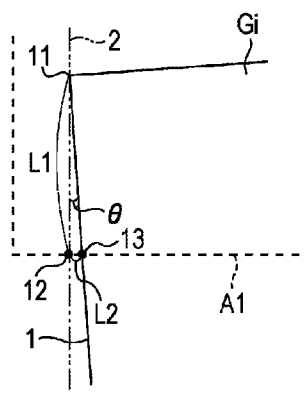

FIGS. 7A and 7B illustrate an example of a first skew detection mode according to the first exemplary embodiment. Specifically, FIG. 7A illustrates a leading-edge region, and FIG. 7B is an enlarged view of a relevant part in FIG. 7A.

The leading-edge detector C9A detects a skew of a document Gi relative to the transport direction thereof based on the region A1 of the leading-edge section of the document Gi in the transport direction thereof. In the first exemplary embodiment, if the reading-rate-prioritized mode is set in the skew-detection setting information, the leading-edge detector C9A is selected to detect a skew. In this specification, the skew detection method using the leading-edge detector C9A may sometimes be referred to as "real-time leading-edge skew detection mode" as an example of a first skew detection mode. In FIGS. 7A and 7B, the leading-edge detector C9A according to the first exemplary embodiment calculates a length L0 in the width direction relative to 400 mm in the transport direction as a skew amount relative to a skew angle θ of a side edge 1 of the document Gi relative to a document transport direction 2 in the leading-edge region A1. Specifically, in FIG. 7B, assuming that the distance from a corner 11 of the leading-edge region A1 to an end 12 of the region A1 in the transport direction is defined as L1 and the distance from the end 12 to a side edge 13 of the document Gi in the width direction is defined as L2, L0=400×L2/L1 stands based on tan θ=L2/L1=L0/400. Therefore, by measuring the distances L1 and L2 in the read image of the region A1, the skew amount L0 is detected by calculation.

The reliability-threshold-value memory C9B stores a reliability threshold value La as an example of a determination amount. In the first exemplary embodiment, the threshold value La is used for determining the reliability of the length L1 in the transport direction instead of using the skew amount L0. Although the threshold value La is appropriately changeable in accordance with, for example, design and specifications, La=1 (mm) may be used as an example.

The reliability determiner C9C determines the reliability of the skew amount L0. Specifically, the reliability determiner C9C determines whether or not a possibility of the skew amount L0 matching the actual skew amount of the document Gi is high. If the length L1 in the transport direction is smaller than or equal to the threshold value La, the reliability determiner C9C according to the first exemplary embodiment determines that the reliability of the skew amount L0 is low.

The entire-image detector C9D detects a skew of the document Gi relative to the transport direction based on the image of the entire region A2 of the document Gi. In the first exemplary embodiment, if the reading-accuracy-prioritized mode is set in the skew-detection setting information, the entire-image detector C9D is selected to detect a skew.

Moreover, if the mixed-size mode is set in the reading settings, the entire-image detector C9D is selected to detect a skew. Furthermore, if the reliability determiner C9C determines that the reliability is low, the entire-image detector C9D is selected to detect a skew. In this specification, the skew detection method using the entire-image detector C9D may sometimes be referred to as "memory-type registrationless mode" as an example of a second skew detection mode. Similarly to the case in FIGS. 7A and 7B, the entire-image detector C9D according to the first exemplary embodiment calculates the length L0 in the width direction relative to 400 mm in the transport direction as a skew amount relative to the skew angle θ of the side edge 1 of the document Gi relative to the document transport direction 2 in the entire region A2. The entire-image detector C9D differs from the leading-edge detector C9A in that the entire-image detector C9D calculates the skew amount L0 based on the entire side edge 1 of the document Gi in the region A2.

The user-setting detector C9E detects a skew of the document Gi based on the read-image region A3 input via the operable section UI and used for detecting the skew of the document Gi. In the first exemplary embodiment, if skew detection is set to be performed based on the settings input by the user via the operable section UI, the user-setting detector C9E is selected to detect a skew. In this specification, the skew detection method using the user-setting detector C9E may sometimes be referred to as "user-setting mode" as an example of a third skew detection mode. Similarly to the case in FIGS. 7A and 7B, the user-setting detector C9E according to the first exemplary embodiment calculates the length L0 in the width direction relative to 400 mm in the transport direction as a skew amount relative to the skew angle θ of the side edge 1 of the document Gi relative to the document transport direction 2 in the region A3 set by the user. The user-setting detector C9E differs from the leading-edge detector C9A in that the user-setting detector C9E calculates the skew amount L0 based on the entire side edge 1 of the document Gi in the region A3.

Flowchart According to First Exemplary Embodiment

Next, the flow of control performed in the copier U according to the first exemplary embodiment will be described with reference to a flowchart.

Flowchart of Skew-Amount Detection Process

Figure 8:
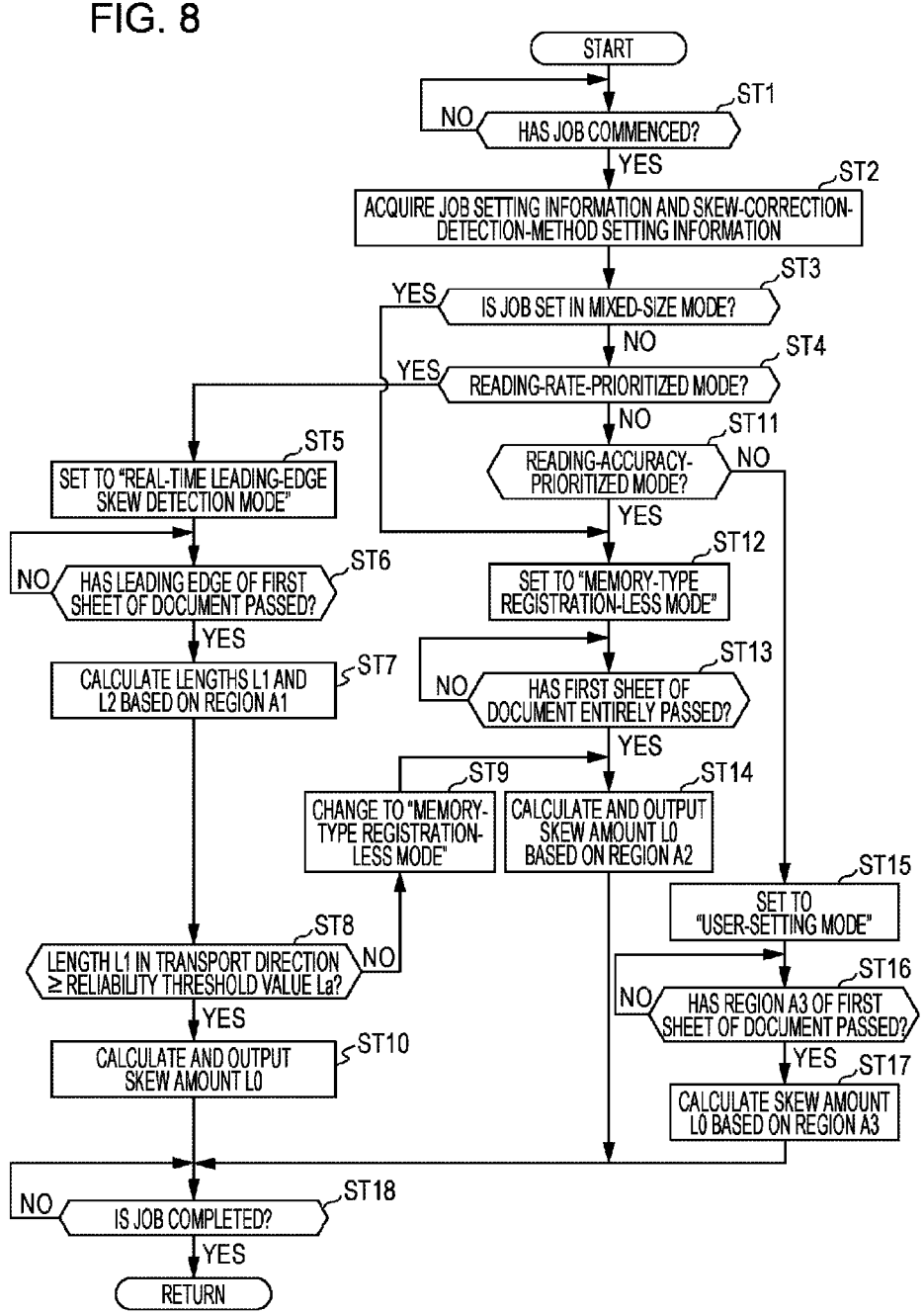
FIG. 8 is a flowchart of a skew-amount detection process according to the first exemplary embodiment.

FIG. 8 is a flowchart of a skew-amount detection process according to the first exemplary embodiment.

Steps ST in the flowchart in FIG. 8 are performed in accordance with a program stored in the controller C of the copier U. Furthermore, this process is executed concurrently with other various processes in the copier U.

The flowchart shown in FIG. 8 starts when the power of the copier U is turned on.

In step ST1 in FIG. 8, it is determined whether or not a job, such as a copying operation, a scanning operation, or a facsimile transmission operation, has commenced. If yes (Y), the process proceeds to step ST2. If not (N), step ST1 is repeated.

In step ST2, reading-process setting information and skew-detection setting information in the job that has started are acquired. The process then proceeds to step ST3.

In step ST3, it is determined whether or not the reading process of the job is set in the mixed-size mode. If not (N), the process proceeds to step ST4. If yes (Y), the process proceeds to step ST12.

In step ST4, it is determined whether or not the skew detection method is set in the reading-rate-prioritized mode.

If yes (Y), the process proceeds to step ST5. If not (N), the process proceeds to step ST11.

In step ST5, the real-time leading-edge skew detection mode is set. The process then proceeds to step ST6.

In step ST6, it is determined whether or not the leading-edge region A1 of a first sheet of a document Gi has been read. If yes (Y), the process proceeds to step ST7. If not (N), step ST6 is repeated.

In step ST7, the lengths L1 and L2 are calculated based on the region A1. The process then proceeds to step ST8.

In step ST8, it is determined whether or not the length L1 in the transport direction is larger than or equal to the reliability threshold value La. If not (N), the process proceeds to step ST9. If yes (Y), the process proceeds to step ST10.

In step ST9, the mode is changed to the memory-type registration-less mode. The process then proceeds to step ST14.

In step ST10, the skew amount L0 is calculated and output. The process then proceeds to step ST18.

In step ST11, it is determined whether or not the skew detection method is set in the reading-accuracy-prioritized mode. If yes (Y), the process proceeds to step ST12. If not (N), the process proceeds to step ST15.

In step ST12, the memory-type registration-less mode is set. The process then proceeds to step ST13.

In step ST13, it is determined whether or not the first sheet of the document Gi has been entirely read. If yes (Y), the process proceeds to step ST14. If not (N), step ST13 is repeated.

In step ST14, the skew amount L0 is calculated based on the region A2. The process then proceeds to step ST18.

In step ST15, the skew detection method is set to the user-setting mode. The process then proceeds to step ST16.

In step ST16, it is determined whether or not the region A3 of the first sheet of the document Gi has been read. If yes (Y), the process proceeds to step ST17. If not (N), step ST16 is repeated.

In step ST17, the skew amount L0 is calculated based on the region A3. The process then proceeds to step ST18.

In step ST18, it is determined whether or not the job is completed. If yes (Y), the process returns to step ST1. If not (N), step ST18 is repeated.

Specific Functions of Scanner Body U1b and Document Transport Device U1a

In the copier U according to the first exemplary embodiment having the above-described configuration, when the copy start button U1c is input in a state where documents Gi are stacked on the document feed tray U1a1, the automatic reading operation is executed. Specifically, each of the documents Gi stacked on the document feed tray U1a1 is fed and transported to the document transport path GH. With regard to each document Gi transported along the document transport path GH, the first face and the second face of the document Gi are read by the solid-state imaging element CCD or the read sensor 26 at the read position P1 or P2.

In the first exemplary embodiment, when a job commences, any one of the real-time leading-edge skew detection mode, the memory-type registration-less mode, and the user-setting mode is selected as the skew-amount detection method in accordance with the reading-process setting information and the skew-detection setting information.

When the real-time leading-edge skew detection mode is set, the skew amount L0 is calculated at a point when the leading-edge region A1 of the document Gi has passed. Therefore, the skew amount L0 is obtained even if the document Gi does not entirely pass the first-face read position P1. Supposing that a skew amount is measured by constantly reading the entire document Gi, the skew amount is measured after the document Gi has entirely passed. Subsequently, after a skew correcting process is performed so as to cancel out the skew amount, an image forming process is performed. This is problematic in that it takes time until the image forming process is actually performed. In contrast, in the first exemplary embodiment, the skew amount L0 is obtained before the entire document Gi passes, thereby ultimately allowing for a faster reading process.

Furthermore, when the memory-type registration-less mode is set in the first exemplary embodiment, the skew amount L0 is detected based on the entire region A2 of the document Gi. Referring to FIG. 6B, in the memory-type registration-less mode, the skew amount L0 is calculated by using the entire side edge 1 of the document Gi. In the case of the real-time leading-edge skew detection mode, the length of the side edge 1 is smaller than that in the memory-type registration-less mode. Therefore, in the real-time leading-edge skew detection mode, for example, if the side edge 1 has a missing portion or is damaged due to breakage of a portion of the corner occurring when removing a staple, the detection accuracy for the skew amount L0 may sometimes deteriorate. In contrast, in the memory-type registration-less mode, the skew amount L0 is calculated using the entire side edge 1 so that the accuracy may be improved, as compared with the case where the skew amount L0 is detected based on the leading edge alone.

Figure 9A:
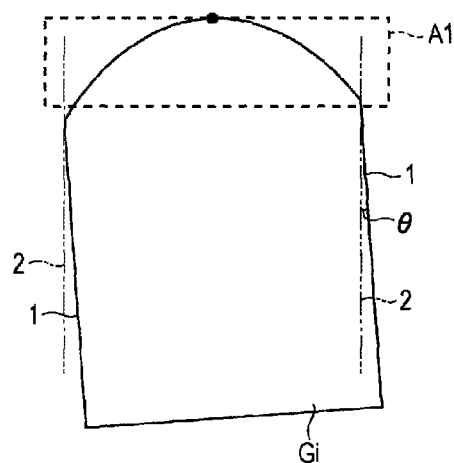
FIGS. 9A to 9C illustrate how a skew is detected in a case where the leading edge of a document is curved, FIG. 9A illustrating the leading edge, FIG. 9B being an enlarged view of a left corner section in FIG. 9A, FIG. 9C being an enlarged view of a right corner section in FIG. 9A.
Figure 9B:
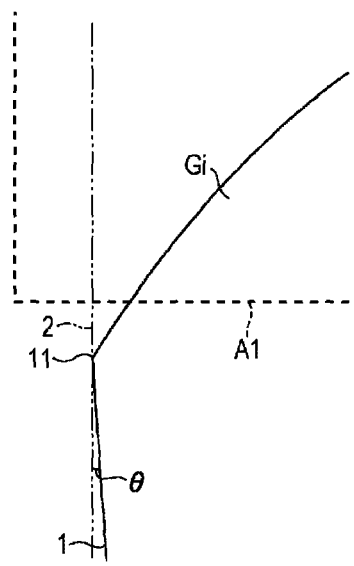
Figure 9C:
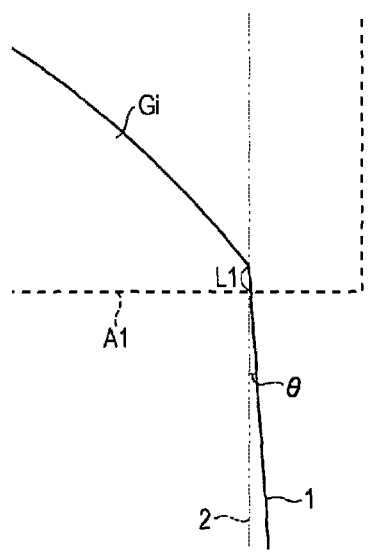

FIGS. 9A to 9C illustrate how a skew is detected in a case where the leading edge of a document is curved. Specifically, FIG. 9A illustrates the leading edge, FIG. 9B is an enlarged view of a left corner section in FIG. 9A, and FIG. 9C is an enlarged view of a right corner section in FIG. 9A.

In the first exemplary embodiment, if the reliability of the skew amount L0 is low even when the real-time leading-edge skew detection mode is set, the mode is switched to the memory-type registration-less mode. If the leading edge of the document Gi is curved, as in FIGS. 9A to 9C, it may sometimes be difficult to measure the lengths L1 and L2 in the leading-edge region A1 due to the corner 11 being outside the region A1, as shown in FIG. 9B, or the lengths L1 and L2 being smaller than the threshold value La, as shown in FIG. 9C. In this case, there is a possibility of a large error when the skew amount L0 is calculated, possibility resulting in low accuracy. Therefore, in the first exemplary embodiment, if the reliability of the skew amount L0 detected in the real-time leading-edge skew detection mode is low, the mode is switched to the memory-type registration-less mode in which the skew amount L0 is calculated from the entire region A2. Thus, a highly-accurate skew amount L0 may be calculated.

Figure 10:
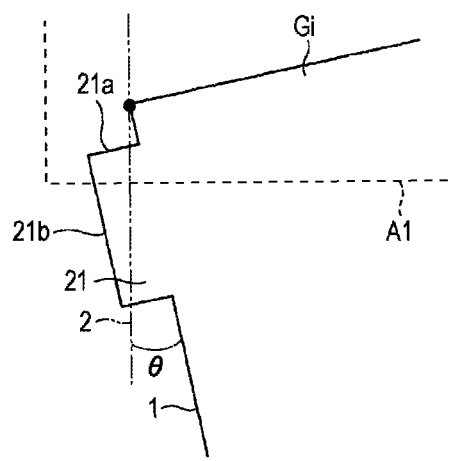
FIG. 10 illustrates a case of a document having an index portion.

FIG. 10 illustrates a case of a document having an index portion.

As shown in FIG. 10, there is a case where a document Gi provided with an index portion 21 is to be read. In this case, in the real-time leading-edge skew detection mode, there is a possibility that the skew amount L0 may be calculated using a leading edge 21a or a side edge 21b of the index portion 21, possibility making it difficult to accurately detect the skew amount L0. Therefore, if the reliability of the skew amount L0 is low, the skew amount L0 is detected in the memory-type registration-less mode. In a case where the user is aware of performing a reading process on the document Gi with the curved leading edge, as shown in FIGS. 9A to 9C, or on the document Gi provided with the index portion 21, as shown in FIG. 10, and designates a region sufficiently wider than the leading-edge region A1 and narrower than the entire region A2, as shown in FIG. 6C, the skew amount L0 may be acquired earlier than in the memory-type registration-less mode while the detection accuracy for the skew amount L0 may be improved relative to that in the real-time leading-edge skew detection mode.

Accordingly, the first exemplary embodiment may provide a document skew detection method desired by the user, in contrast with Japanese Unexamined Patent Application Publication Nos. 2013-146034 and 2015-18328 in which the skew of the document Gi is detected from image information of the leading edge of the document Gi.

Furthermore, in the first exemplary embodiment, if a bundle of documents Gi includes a mixture of documents of different sizes, the memory-type registration-less mode is automatically selected. In the case of a mixture of documents of different sizes, the read images are entirely stored and the document sizes are detected. Even when the skew amount L0 is calculated in the memory-type registration-less mode concurrently with the document-size detection, there is hardly any delay in the overall process. Therefore, as compared with a configuration that performs the detection in the real-time leading-edge skew detection mode in the case of a mixture of documents of different sizes, the detection accuracy for the skew amount L0 may be improved while a delay in the reading process may be suppressed.

Modifications

Although the exemplary embodiment of the present invention has been described in detail above, the present invention is not to be limited to the above exemplary embodiment and permits various modifications within the technical scope of the invention defined in the claims. Modifications H01 to H09 will be described below.

In a first modification H01, the image forming apparatus according to the above exemplary embodiment is not limited to the copier U, and may be, for example, a facsimile apparatus or a multifunction apparatus having multiple functions of such apparatuses. Furthermore, the above exemplary embodiment is not limited to an electrophotographic image forming apparatus and may be applied to an image forming apparatus of an arbitrary image forming type, such as a lithographic printer of an inkjet recording type or a thermal head type. Moreover, the above exemplary embodiment is not limited to a multicolor image forming apparatus and may be applied to a so-called monochrome image forming apparatus. The above exemplary embodiment is not limited to a so-called tandem-type image forming apparatus and may be applied to, for example, a rotary-type image forming apparatus.

The above exemplary embodiment is applied to the copier U having the scanner section U1 as an example of an image reading device. Alternatively, in a second modification H02, the above exemplary embodiment may be applied to the scanner section U1 alone.

The above exemplary embodiment is applied to the scanner section U1 that is capable of executing the automatic reading operation and the manual reading operation. Alternatively, for example, in a third modification H03, a configuration in which only the automatic reading operation is executable and the manual reading operation is omitted is possible.

In the above exemplary embodiment, the document transport device U1a desirably uses the reading members CCD and 26 to read images of documents Gi at the two read positions P1 and P2. Alternatively, for example, a fourth modification H04 may provide a configuration in which the read sensor 26 is omitted and a document-inverting transport path is provided such that an image of the document Gi is read only at the read position P1, or a configuration that reads only one face of the document Gi.

As a fifth modification H05 of the above exemplary embodiment, for example, the skew correcting process may be performed on the document Gi before the reading process by bringing the document Gi into abutment with the take-away roller 18. Alternatively, the skew correcting process may be performed by bringing the document Gi into abutment with the document registration roller 23 instead of the take-away roller 18.

In the above exemplary embodiment, it is desirable to allow for the user-setting mode. Alternatively, in a sixth modification H06, the user-setting mode may be not provided.

In the above exemplary embodiment, it is desirable to provide the configuration for determining the reliability of the skew amount L0. Alternatively, in a seventh modification H07, such a configuration may be not provided. Moreover, although the reliability of the skew amount L0 is determined based on the length L1 in the transport direction, a modification is permissible, such as determining the reliability of the skew amount L0 based on the length L2 or determining that the reliability is low when the angle θ is excessively larger than an assumed range.

In the above exemplary embodiment, it is desirable that the memory-type registration-less mode be selected in the case of a mixture of documents of different sizes. Alternatively, in an eighth modification H08, the real-time leading-edge skew detection mode may be used.

In the above exemplary embodiment, the skew-amount calculation method is not limited to the method described in the exemplary embodiment. For example, in a ninth modification H09, the skew amount may be calculated based on any known method in the related art, such as employing Hough transform as described in Japanese Unexamined Patent Application Publication No. 2015-18328.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
    a reading member that reads an image of a passing document at a read position preset in a document transport path; and
    a skew detector that detects a skew of the document by selecting one of a first skew detection mode and a second skew detection mode based on information that specifies a method for detecting the skew of the document,
    the first skew detection mode being a mode in which the skew of the document relative to a transport direction is detected based on an image of only a leading-edge section of the passing document, in the transport direction, read by the reading member, the second skew detection mode being a mode in which the skew of the document relative to the transport direction is detected based on an entire image read by the reading member.

2. The image reading device according to claim 1, wherein the skew detector detects the skew of the document by selecting any one of a third skew detection mode, the first skew detection mode, and the second skew detection mode, the third skew detection mode being a mode in which the skew of the document is detected based on a read-image range input via an operable section and used for detecting the skew of the document.

3. An image forming apparatus comprising:
the image reading device according to claim 1; and
an image recording device that records an image onto a medium based on an image read by the image reading device.

4. An image reading device comprising:
a reading member that reads an image of a passing document at a read position preset in a document transport path; and
a skew detector that detects a skew of the document by selecting one of a first skew detection mode and a second skew detection mode based on information that specifies a method for detecting the skew of the document,
the first skew detection mode being a mode in which the skew of the document relative to a transport direction is detected based on an image of a leading-edge section, in the transport direction, read by the reading member,
the second skew detection mode being a mode in which the skew of the document relative to the transport direction is detected based on an entire image read by the reading member,
wherein the skew detector detects the skew of the document by switching to the second skew detection mode if reliability of a skew amount detected in the first skew detection mode is determined as being low based on the skew amount and a preset determination amount.

5. An image reading device comprising:
a reading member that reads an image of a passing document at a read position preset in a document transport path; and
a skew detector that detects a skew of the document by selecting one of a first skew detection mode and a second skew detection mode based on information that specifies a method for detecting the skew of the document,
the first skew detection mode being a mode in which the skew of the document relative to a transport direction is detected based on an image of a leading-edge section, in the transport direction, read by the reading member,
the second skew detection mode being a mode in which the skew of the document relative to the transport direction is detected based on an entire image read by the reading member,
wherein the skew detector selects the second skew detection mode if the entire image of the document is to be stored into a memory based on a document reading setting.

6. An image reading device comprising:
a reading member that reads an image of a passing document at a read position preset in a document transport path;
a first skew detection mode in which a skew of the document relative to a transport direction is detected based on an image of only a leading-edge section of the passing document in the transport direction;
a second skew detection mode in which the skew of the document relative to the transport direction is detected based on an entire image read by the reading member; and
a skew detector that detects the skew of the document by selecting one of the first skew detection mode and the second skew detection mode based on information that specifies a method for detecting the skew of the document.

* * * * *